United States Patent Office 3,591,685
Patented July 6, 1971

3,591,685
CONTROLLING MOSQUITOES WITH 3',4'-DI-CHLORO-5-NITRO-3-PHENYLSALICYLANILIDE
John P. Chupp, Kirkwood, Mo., and Jack D. Early, Bethesda, Md., assignors to Monsanto Company, St. Louis, Mo.
No Drawing. Original application May 28, 1968, Ser. No. 732,534, now Patent No. 3,541,148, dated Nov. 17, 1970. Divided and this application Feb. 11, 1970, Ser. No. 10,630
Int. Cl. A01n 9/20
U.S. Cl. 424—230                                    1 Claim

ABSTRACT OF THE DISCLOSURE

Controlling mosquitoes with 3',4'-dichloro-5-nitro-3-phenylsalicylanilide.

---

This application is a division of copending application Ser. No. 732,534 filed May 28, 1968, now U.S. Pat. 3,541,148.

This invention relates to 3',4'-dichloro-5-nitro-3-phenylsalicylanilide which structurally is

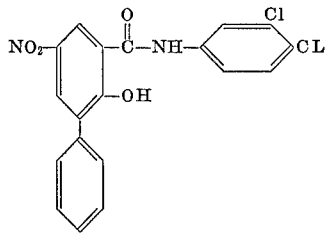

for controlling mosquitoes by contacting the larvae thereof with same.

The compound of this invention is readily prepared by heating a substantially equimolecular mixture of 3,4-dichloro aniline and the phenyl ester of 5-nitro-3-phenylsalicylic acid. For example 12.1 parts by weight of 3,4-dichloroaniline and 23 parts by weight of phenyl 5-nitro-3-phenylsalicylate are added to a suitable reaction vessel equipped with an agitator and thermometer, heated up to about 225° C., and while agitating, maintaining the temperature in the range of about 220° C. to about 230° C. for about four hours. The reaction mass is then cooled to room temperature, and the solid residue washed first with dilute hydrochloric acid, then with aqueous sodium bicarbonate and finally with water and thereafter dried. The so treated solid upon recrystallizing from ethyl alcohol is 3',4' - dichloro - 5 - nitro - 3 - phenylsalicylanilide which melts in the range of 250–253° C. The phenyl ester of 5-nitro-3-phenylsalicylic acid precursor (M.P. 142.5–143.5° C.) is readily prepared by the well-known procedure for preparing phenyl salicylate esters (note— U.S. 2,865,861) by heating an equimolecular mixture of phenol and 5-nitro-3-phenylsalicylic acid in the presence of a dehydrating amount of phosphorus trichloride or phosphorus oxychloride. The said 5-nitro-3-phenylsalicylic acid, which melts at about 228° C. is prepared also by the well-known procedures for nitrating salicylic acid in the 5-position [note—J.A.C.S., vol. 44 (1922), p. 791] from 3-phenylsalicylic acid dissolved in glacial acetic acid employing 90% nitric acid at about room temperature.

To illustrate the outstanding activity of the compound of this invention with respect to control of mosquito larvae it was observed employing a standard evaluation procedure that at a concentration of 2 p.p.m. it exhibited a 100% kill of 3-day old early instar yellow fever mosquito larvae (*Aedes aegypti*) whereas in contrast thereto (a) its 5-chloro counterpart, that is 3',4',5-trichloro-3-phenylsalicylanilide (note—U.S. 3,231,465), in the same evaluation procedure at the same concentration of 2 p.p.m. exhibited but a 50% kill of the same species of mosquito larvae, and (b) its position isomer 3',5-dichloro-4'-nitro-3-phenylsalicylanilide (note—U.S. 3,382,145) in the same evaluation procedure at the same concentration of 2 p.p.m. exhibited no kill of the same species of mosquito larvae. In the same identical evaluation procedure 3 - tert.butyl - 3',5 - dichloro - 4' - nitrosalicylanilide (M.P. 207.5–208.5° C.) and 3 - tert.butyl - 4',5 - dichloro-3'-nitrosalicylanilide (M.P. 189–190.5° C.), respectively, exhibited substantially no kill of the same species of mosquito larvae at a concentration of 2 p.p.m.

The larvae of the mosquito sought to be combatted have a water habitat and therefore the compound of this invention can be added per se to the water, or in the form of a formulated dust and cast upon the surface of the water, or sprayed upon the water in the form of a solution or liquid dispersion thereof or a liquid emulsion formulation thereof, provided the amount applied is a toxic amount.

Inert diluent powders for the formulation of such dusts include fuller's earth, diatomaceous earth, bentonite, talc, pyrophillite, soybean flour, wood flour, and walnut shell flour, which dusts preferably have a particle size of 5 microns or below and contain from 10 to 75 percent by weight of the compound of this invention. Ordinarily such dusts will be applied at the rate of about 25 to 50 pounds per acre of surface area, however, larger or smaller amounts can be employed. These dusts can also contain from 1 to 5 percent by weight of a non-ionic surfactant to provide a "wettable" dust formulation. Liquid formulations can be prepared by dissolving or dispersing the compound of this invention in a suitable organic liquid such as 2-octanone and sprayed as such or in admixture with a non-ionic emulsifier to form a liquid emulsion formulation for spray purposes. The actual effective toxic concentration of the compound of this invention for larvicidal purposes will depend upon the particular mosquito larvae, weather conditions, and whether it is to be applied directly to the water which forms the habitat for the larvae either as the compound per se or in the form of formulations thereof.

In all of the forms described above the dispersions or formulations or solutions can be provided ready for use in combatting mosquito larvae or they can be provided in a concentrated form suitable for mixing with or dispersing in any of the well-known inert extending agents. As illustrative of a particularly useful concentrate is an intimate mixture of the salicylanilide of this invention with a water-soluble non-ionic surfactant which lowers the surface tension of water in the weight proportions of 0.1 to 15 parts of surfactant with sufficient of the salicylanilide of this invention to make 100 parts by weight. Such a concentrate is particularly adapted to be made ino a spray for controlling various mosquito larvae by the addition of water thereto. As illustrative of such a concentrate is an intimate mixture of 20 parts by weight of 3',4'-dichloro-5-nitro-3-phenylsalicylanide and 2 to 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for controlling mosquito larvae is a solution (preferably as concentrated as possible) of the salicylanilide of this invention in an organic solvent therefor. The said liquid concentrate preferably contains dissolved therein a minor amount (e.g. 0.5 to 10 percent by weight of the weight of the salicylanilide of this invention) of a non-ionic surfactant, which surfactant is also water-soluble. As illustrative of such a concentrate is a solution of 3',4'-dichloro-5-nitro-3-phenylsalicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions, formulations, solutions or concentrates described hereinbefore for mosquito larvicidal purposes, the compound of this invention can be advantageously employed in combination with other pesticides, including, for example, gastropodicides, bactericides, fungicides, and herbicides, as well as other larvicides. In this manner it is possible to obtain mixtures which are effective against a wide variety of pests and other forms of nonoxous life.

While this invention has been described with respect to certain embodiments it is to be understood that it is not so limited and that variations and modifications thereof obvious to those skilled in the art can be made without departing from the spirit or scope of this invention.

What is claimed is:

1. A method of controlling mosquitoes which comprises applying to the larvae thereof and their habitat a toxic amount of 3′,4′-dichloro-5-nitro-3-phenylsalicylanilide.

References Cited
UNITED STATES PATENTS

| | | | |
|---|---|---|---|
| 3,147,300 | 9/1964 | Schraufstatter et al. | 260—559 |
| 3,382,145 | 5/1968 | Chupp et al. | 167—30 |

ALBERT T. MEYERS, Primary Examiner

A. J. ROBINSON, Assistant Examiner